US006438604B1

(12) United States Patent
Kuver et al.

(10) Patent No.: US 6,438,604 B1
(45) Date of Patent: Aug. 20, 2002

(54) DIGITAL VIDEO NETWORK INTERFACE

(75) Inventors: Walter D. Kuver, Laguna Hills; Osman Ozay Oktay, Irvine; Gregory F. Beck, Laguna Hills; Wei Zhou, Irvine; Robert D. Wadsworth, Costa Mesa; Elias Montenegro, Mission Viejo; Tony K. Ip, Trabuco Canyon; Royce Earle Slick, Mission Viejo; Don Francis Purpura, Yorba Linda; Trent Lee England, Costa Mesa, all of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/166,487

(22) Filed: Oct. 5, 1998

(51) Int. Cl.$^7$ .............................................. G06F 13/00
(52) U.S. Cl. ........................ 709/234; 710/53; 710/56; 709/214; 711/170
(58) Field of Search .................................. 709/224, 231, 709/213, 214, 234; 710/52, 53, 56, 57; 711/170

(56) References Cited

U.S. PATENT DOCUMENTS

| | | | | |
|---|---|---|---|---|
| 5,163,132 A | * | 11/1992 | DuLac et al. ................ 710/53 |
| 5,325,355 A | | 6/1994 | Oprescu et al. ............. 370/282 |
| 5,361,372 A | * | 11/1994 | Rege et al. .................. 709/234 |
| 5,384,808 A | | 1/1995 | Van Brunt et al. .......... 375/257 |
| 5,394,556 A | | 2/1995 | Oprescu ...................... 709/220 |
| 5,400,340 A | | 3/1995 | Hillman et al. ............. 375/419 |
| 5,408,501 A | | 4/1995 | Cornaby ..................... 375/260 |
| 5,412,697 A | | 5/1995 | Van Brunt et al. .......... 375/360 |
| 5,412,698 A | | 5/1995 | Van Brunt et al. .......... 375/373 |
| 5,424,657 A | | 6/1995 | Van Brunt et al. ........... 326/63 |
| 5,483,518 A | | 1/1996 | Whetsel ....................... 370/241 |
| 5,483,656 A | | 1/1996 | Oprescu et al. ............. 713/320 |
| 5,485,458 A | | 1/1996 | Oprescu et al. ............. 370/409 |
| 5,485,488 A | | 1/1996 | Van Brunt et al. .......... 375/257 |
| 5,493,570 A | | 2/1996 | Hillman et al. ............. 370/516 |
| 5,493,657 A | | 2/1996 | Van Brunt et al. .......... 710/305 |
| 5,495,481 A | | 2/1996 | Duckwall ................... 370/462 |

(List continued on next page.)

FOREIGN PATENT DOCUMENTS

EP          0 621 538 A2   *  10/1994

OTHER PUBLICATIONS

IEEE Standard For A High Performance Serial Bus, Microprocessor And Microcomputer Standards Commitee of the IEEE Computer Society, Aug. 30, 1996.

"Universal Serial Bus Specification", Compaq et al., Revision 1.0, pp. 1–268 Jan. 15, 1996.

*Primary Examiner*—Kenneth R. Coulter
(74) *Attorney, Agent, or Firm*—Fitzpatrick Cella Harper & Scinto

(57) ABSTRACT

A digital video network interface for transferring isochronous video data over an asynchronous local area network, including an isochronous interface for transmitting digital video data isochronously, a memory comprising first and second buffers for storing the isochronous video data, a network interface for transmitting video data from either the first or second buffers over the asynchronous local area network, and a memory buffer manager for controlling the output of the video data over the asynchronous local area network and for controlling the input/output of video data into/from the first or second buffers, wherein, when either the first or second buffers is filled with video data, the memory buffer manager shifts the input of data into an empty buffer and begins outputting video data to the asynchronous local area network from a filled buffer, upon receiving access to the local area network. Complementary ones of such video network interfaces may be provided on a network so as to permit one-way video streaming (to one or more receiving sites) or two-way video conferencing with network interfaces operating in full-duplex mode.

41 Claims, 9 Drawing Sheets

U.S. PATENT DOCUMENTS

| | | | |
|---|---|---|---|
| 5,504,458 A | 4/1996 | Van Brunt et al. | 330/255 |
| 5,504,757 A | 4/1996 | Cook et al. | 370/468 |
| 5,509,126 A | 4/1996 | Oprescu et al. | 710/307 |
| 5,535,208 A | 7/1996 | Kawakami et al. | 370/391 |
| 5,559,967 A | 9/1996 | Oprescu et al. | 710/105 |
| 5,568,192 A | 10/1996 | Hannah | 348/222 |
| 5,579,486 A | 11/1996 | Oprescu et al. | 710/107 |
| 5,581,541 A | 12/1996 | Whetsel | 370/241 |
| 5,592,237 A | 1/1997 | Greenway et al. | 348/716 |
| 5,603,058 A | 2/1997 | Belknap et al. | 710/35 |
| 5,606,268 A | 2/1997 | Van Brunt | 326/68 |
| 5,615,404 A | 3/1997 | Knoll et al. | 710/62 |
| 5,617,420 A | 4/1997 | Whetsel | 370/402 |
| 5,619,541 A | 4/1997 | Van Brunt | 375/360 |
| 5,619,646 A | 4/1997 | Hoch et al. | 370/476 |
| 5,621,901 A | 4/1997 | Morris et al. | 710/305 |
| 5,625,795 A * | 4/1997 | Sakakura et al. | 711/148 |
| 5,630,173 A | 5/1997 | Oprescu | 710/40 |
| 5,632,016 A | 5/1997 | Hoch et al. | 710/30 |
| 5,633,871 A | 5/1997 | Bloks | 370/471 |
| 5,640,521 A | 6/1997 | Whetsel | 710/316 |
| 5,646,941 A | 7/1997 | Nishimura et al. | 370/389 |
| 5,661,395 A | 8/1997 | Johnson et al. | 323/273 |
| 5,675,139 A | 10/1997 | Fama | 235/472.01 |
| 5,682,484 A | 10/1997 | Lambrecht | 710/311 |
| 5,687,319 A | 11/1997 | Cook et al. | 370/256 |
| 5,689,244 A | 11/1997 | Iijima et al. | 340/3.9 |
| 5,689,507 A | 11/1997 | Bloks et al. | 370/389 |
| 5,719,786 A | 2/1998 | Nelson et al. | 709/219 |
| 5,784,698 A * | 7/1998 | Brady et al. | 711/171 |
| 5,815,678 A * | 9/1998 | Hoffman et al. | 710/305 |
| 5,819,033 A * | 10/1998 | Caccavale | 709/224 |
| 5,974,518 A * | 10/1999 | Nogradi | 711/173 |
| 6,014,727 A * | 1/2000 | Creemer | 711/118 |
| 6,055,590 A * | 4/2000 | Pettey et al. | 710/56 |
| 6,192,428 B1 * | 2/2001 | Abramson et al. | 710/52 |
| 6,279,052 B1 * | 8/2001 | Upadrastra | 710/22 |

* cited by examiner

| data_length | tag | channel | tcode | sy |
|---|---|---|---|---|
| header_CRC ||||||
| data field ||||||
| data_CRC ||||||

FIG. 3B

DIGITAL VIDEO NETWORK INTERFACE

SOFTWARE APPENDIX

This application is being filed with a software code appendix which contains material which is subject to copyright protection. The copyright owner has no objection to the facsimile reproduction by anyone of the software code or the patent disclosure, as it appears in the Patent and Trademark Office patent files or records, but otherwise reserves all copyright rights whatsoever.

INCORPORATION BY REFERENCE

A compact disc, and an identical duplicate thereof, containing a computer program listing appendix of the Software Appendix has been submitted, both of which are herein incorporated by reference. Each compact disc contains a single ASCII text file named "09_166,487 Appendix.Txt", which was created on Jan. 22, 2002 and is 44 kilobytes in size.

BACKGROUND OF THE INVENTION

1. Field of the Invention

The present invention relates to a system for transmitting real time digital video data (including both audio and video) over a local area network. More specifically, the present invention relates to a system for transmitting digital video data from an isochronous source such as a digital video camera using IEEE 1394 isochronous protocol, through an asynchronous local area network, to an isochronous destination such as another digital video camera or a monitor via IEEE 1394 isochronous protocol, all while maintaining isochrony of transmission and delivery.

2. Description of Related Art

Local Area Networks (LANs) have traditionally been used for accessing files or sending print data to a networked printer. Data delivery on a network such as Ethernet is asynchronous, meaning that there is no synchronization between transmission time and delivery time. Rather, for the typical application, the most critical feature of the network is its guarantee that data will be delivered successfully.

Digital video data, on the other hand, is unique in that the timeliness with which data is delivered is more important than the guarantee of data delivery. Specifically, because of the fleeting nature of digital video data, if it is not delivered in time, then its guaranteed delivery at a later time is meaningless since the data will be stale and simply not used.

One popular protocol for carrying digital video data is the IEEE 1394 isochronous protocol, where the timely delivery of digital video data is more critical than the guarantee of its delivery. Digital video data is carried on an IEEE 1394 serial bus (popularly referred to by the trademark "Fire Wire") as isochronous data. The term isochronous means equal-time, and in the context of IEEE 1394 protocol means that new data is available at cyclical intervals (such as every 125 microseconds) although the timing of data within any one interval is uncertain. The isochronous nature of this data is such that data of this type has no value if it is received after its specific time window of use. In fact, the timely delivery of this data is so critical that in the case of a transmission error no retries are attempted. It was recognized by the designers of the IEEE 1394 bus protocol that by the time any retry attempts could be made, the time window for the usage of isochronous data would be passed.

Digital video ("DV") data is transmitted under IEEE 1394 as isochronous data packets that may contain both audio and video components. Although there is no guarantee that a packet can be sent exactly at a periodic rate, IEEE 1394 guarantees that data is available sometime within each periodic interval (equal to 125 micro-seconds). Another feature of the IEEE 1394 interface is that applications can reserve bandwidth (or "channels") in the IEEE 1394 bandwidth and therefore delivery of a digital video packet can be guaranteed.

The IEEE 1394 industry standard interface provides superior bandwidth for high speed transmission of data. Because of its unique features, the IEEE 1394 high speed serial bus is used for transmitting full-motion digital video from a digital video camera, to a digital video recorder, to a personal computer, or to any peripheral device which may store or display the video. Currently, however, the IEEE 1394 standard interface has at least one shortcoming: the maximum cable length is limited to 4.5 meters. Therefore, digital video data cannot be transferred and viewed in real time at a remote location greater than 4.5 meters from the source of the video data.

Although the cable length limitation is being addressed by a new version of the IEEE 1394 standard, this newer version would involve costly and non-standard usages, such as a fiber optic cable with different IEEE 1394 components.

On the other hand, asynchronous networks such as Ethernet are in widespread use, and provide geographically remote access to large volumes of data. Particularly, with-the recent introduction of 100 BaseT and Gigabit Ethernet, fast access to large volumes of data is also provided. It is therefore expected that the Ethernet interface will continue to offer a lower cost, higher speed and longer distance connection than an equivalent IEEE 1394 connection. It is for this reason there is a benefit to find a way to provide the transport of isochronous digital video data across an asynchronous transport that does not inherently provide isochrony.

SUMMARY OF THE INVENTION

It is therefore an object of the present invention to transmit digital video data (video and audio) over a high speed local area network. More specifically, the present invention relates to sending isochronous data over an asynchronous network transport that does not specifically support isochrony.

It is another object of the present invention to provide a system for transmitting digital video data, which is output isochronously, between peripheral devices in real time by integrating a local area network between the transmitting digital video camera and the receiving digital video camera. It is also an object of the present invention to provide a method and an apparatus for maintaining real time transfer of the isochronous video data without degradation of the video signal.

Thus, according to one aspect, the present invention is a digital video network interface for transferring isochronous video data over an asynchronous local area network. The digital video network interface includes, on a transmitting side, an isochronous interface for receiving digital video data isochronously, a buffer comprising first and second memory areas for storing the isochronous video data, and a network interface for transmitting video data from either the first or second memory areas over the asynchronous local area network. On a reception side, the digital video network interface also includes a reception memory buffer manager for controlling receipt of the video data from the asynchronous network and the storage of the data into memory, which is not ordinarily partitioned into first and second memory areas. An input pointer is used to track where newly received asynchronous data is stored to memory, and an empty pointer is used to track where data is extracted from memory for conversion to isochronous data. The memory buffer manager shifts the input of data into the memory pointed to by the input pointer and begins outputting video data from the memory pointed to by the empty pointer to an isochronous packet handler that converts the asynchronous data to isochronous. The isochronous data may thereafter be utilized in accordance with IEEE 1394 protocol, such as by viewing on a digital video camera.

By virtue of the foregoing arrangement, even though the network is an asynchronous data carrier, isochronous data can be transmitted over a network that does not support isochrony, since it is the sending and receiving stations that are responsible for maintaining isochrony. In particular, buffering at the transmitting end accommodates delays that might occur while waiting to access to the asynchronous network, while buffering at the receiving end accommodates delays in new asynchronous packets, by buffering data packets that had previously arrived too quickly for the isochronous packet handler to accommodate. As a result, although latency is introduced in the digital video data (corresponding to the length of the buffers but preferably below around 0.3 seconds), isochronous transmission and reception is preserved, even over an asynchronous network that does not support isochrony. Moreover, as the data-carrying capacity of the network increases, the latency can be reduced since the amount of buffering needed to ensure data availability can be reduced. For example, in a Gigabit Ethernet whose bandwidth is 125 MBytes/second, as compared to digital video data of 3.7 MBytes/second, the delivery of 1000 data packets in 125 milliseconds is virtually certain, and can be achieved with a latency of only 0.125 seconds.

In another aspect of the invention, the present invention is a method for transferring data between an isochronous data source and an asynchronous local area network. Data packets are received isochronously from an isochronous data. source, the data packets from the isochronous data source are stored in a buffer having first and second memory areas, and the asynchronous local area network is accessed. To transfer the data packets over the asynchronous local area network, the data packets are stored in either the first or second memory areas of the buffer such that when one memory area is filled, the other memory area receives data, and data packets from the filled memory area are transferred. Upon the filling of a memory area, network access is requested and, upon receiving access, the data packets from the filled memory location are output over the asynchronous local area network.

In yet another aspect of the invention, the present invention is a digital video network system which includes an asynchronous local area network for transferring data, a digital video camera for generating digital video data isochronously, and a remote digital video device for receiving digital video data isochronously. A transmitting-side digital video network interface transfers data between the digital video camera and the asynchronous network, with the transmitting-side digital video network interface having an isochronous interface for receiving data packets from the digital video camera isochronously, a transmit buffer having first and second memory locations for storing data packets, a network interface for transferring the data packets from either the first or second memory locations of the buffer through the asynchronous local area network, and a transmit memory buffer manager for 1) controlling the transfer of data packets from the isochronous interface to either of the first or second memory locations in the buffer, and 2) controlling the transfer of data packets from either the first or second memory locations of the buffer through the network interface by requesting access to the asynchronous local area network. According to this aspect of the invention, the transmit memory buffer manager controls the storage of the data packets into either the first or second memory location of the buffer, and, when one memory location has been filled, the transmit memory buffer manager requests access to the network. Upon receiving access, data packets from the filled memory location are transmitted.

On the receiving side, the digital video network system includes a receiving-side digital video network interface for transferring data between the asynchronous local area network and the peripheral digital video device. The receiving-side digital video network interface includes a network interface for receiving video data packets from the asynchronous local area network, a receipt buffer for storing asynchronous data, a receiving isochronous interface for transmitting video data packets to the peripheral digital video device, and a receipt memory buffer manager for 1) controlling the transfer of data packets from the network interface to the receipt buffer at a location pointed to by an input pointer, and 2) controlling the transfer of video data packets from the buffer at a location pointed to by an empty pointer to the receiving isochronous interface. The receipt memory buffer manager controls the output of video data in an isochronous fashion from the buffer through to the receiving isochronous interface.

In another aspect of the invention, for use in a digital video conferencing system, the full-duplex capability of the asynchronous network is used to simultaneously transmit isochronous digital video data between 1394 network controllers in each direction. A second digital video camera, recording device, or display monitor is added to the 1394 interface bus of each controller such that the isochronous bandwidth of the bus is shared by a transmitting device and a receiving device on that bus. Each 1394 network controller establishes both an isochronous transmit communications process and a isochronous receiving communications process with the other 1394 network controller through the asynchronous network that connects them.

In yet another aspect of the invention, for use in a digital video conferencing system, digital video data is transmitted bi-directionally from one isochronous bus to another isochronous bus via an asynchronous network. An isochronous communication and an asynchronous network connection are established at the receiving side, and an isochronous communication and an asynchronous network connection are established at the sending side. The sending side and receiving side negotiate to open an asynchronous transmission. Isochronous digital video data is converted into asynchronous network data at the sending side, the asynchronous network data packets are transmitted to the receiving side, the asynchronous network data is received at the receiving side, and the asynchronous network data is converted to isochronous digital video data at the receiving side. Likewise, isochronous digital video data is converted into asynchronous network data at the receiving side, the asynchronous network data packets are transmitted to the sending side, the asynchronous network data is received at the sending side, and the asynchronous network data is converted to isochronous digital video data at the sending side.

These and other features and advantages according to the present invention will be more readily understood by reference to the following detailed description of the preferred embodiment taken in conjunction with the attached drawings.

BRIEF DESCRIPTION OF THE DRAWINGS

FIG. 3B is an illustration of the IEEE 1394 isochronous data packet format;

DETAILED DESCRIPTION OF THE INVENTION

Figure 1:
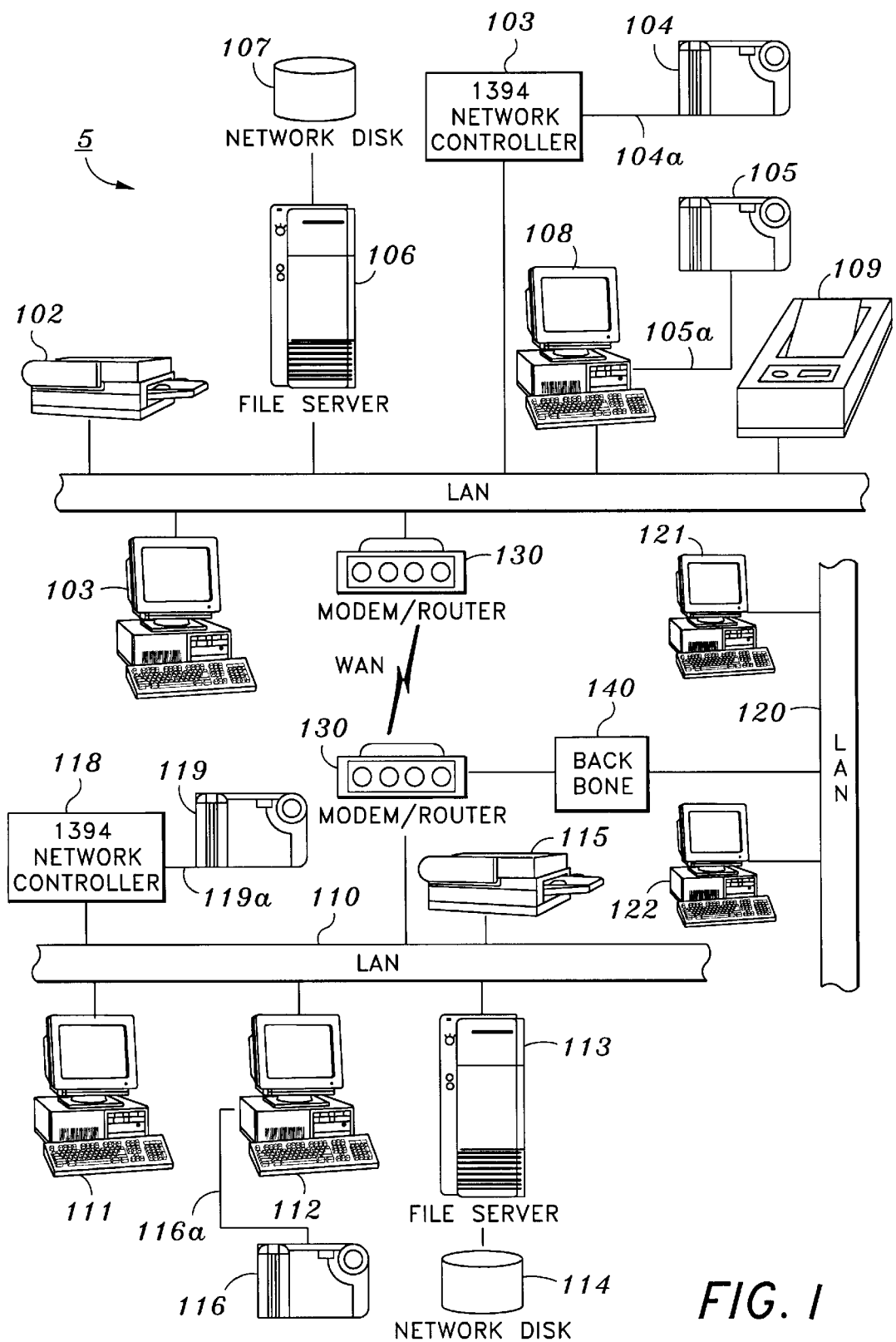
FIG. 1 is a topological view of representative local and wide area networks to which the present invention may be applied.

FIG. 1 is a topological view of a representative local area network (LAN) or wide area network (WAN) to which the present invention may be applied. Shown in FIG. 1 are three separate LANS, 100, 110 and 120, connected to each other through modem 130 and backbone 140 into an overall WAN 5. Each of LANs 100, 110 and 120 may be configured physically into any of the known network configurations, such as Ethernet or high speed Token Ring, and each LAN may carry network transmissions using one or more network protocols over one or more frame types. At least some of LANs 100, 110 and 120 transmit data asynchronously in the sense that they do not support isochrony. Presently preferred embodiments of the invention, however, utilize a Gigabit Ethernet network, using UDP protocol.

Connected to each of the LANs 100, 110 and 120 are plural work stations and plural networked devices, some of which provide for isochronous digital video data pursuant to the invention. For example, connected to LAN 100 are work stations 101 and 108, together with network devices including printers 102 and scanner 109. Also connected to LAN 100 is file server 106 which manages access to files stored on large capacity network disk 107. Other unshown network devices and work stations may also be connected to LAN 100.

Particular attention is directed to 1394 Network Controller 103, which interfaces to LAN 100, and to which is connected a digital camera 104 through an isochronous IEEE 1394 interface designated as 104a. According to the invention, 1394 Network Controller 103 is operable in either a sending mode or a receiving mode, or both modes simultaneously in the case of digital video conferencing. In a sending mode, 1394 Network Controller 103 converts isochronously-received digital video data from digital camera 104 into asynchronous network transmissions for transmission out onto LAN 100. In the receiving mode, 1394 Network Controller 103 operates to convert asynchronously-received digital video data from LAN 100 into corresponding isochronous data, for viewing by camera 104. In a digital video conference mode, 1394 Network Controller 103 operates in both modes simultaneously, so as to send and receive asynchronous data from LAN 100 and to send and receive isochronous data from IEEE 1394 bus 104a. In the video conferencing mode, more than one digital video camera 104 might be required (or a camera and a monitor might be required) so that one digital video camera receipt can input digital video images while the other device is outputting digital video images received from a remote station. FIG. 1 further shows digital video camera 105 connected to work station 108 through a IEEE 1394 bus 105a.

The depiction of camera 105 is meant to emphasize that the invention can be implemented in a stand-alone device, such as 1394 Network Controller 103, or can be implemented with software and hardware modifications to a work station such as 108 that supports IEEE 1394 bus protocol.

Directing attention to other LANs depicted in FIG. 1, LAN 110 has connected to it work stations 111 and 112, as well as networked devices such as printer 115, and file server 113 which manages access to large capacity network disk 114. Also connected to LAN 110 is 1394 Network Controller 118 having digital camera 119 that provides isochronous digital video data according to a IEEE 1394 protocol on 1394 bus 119a. 1394 Network Controller 118 is similar in construction to 1394 Network Controller 103, as described in more detail hereinbelow. In addition, and complementary to the construction shown in connection with LAN 100, work station 112 may include a digital video camera 116 interfaced via a IEEE 1394 bus 116a.

LAN 120 includes work stations 121 and 122, as well as various unshown network devices which may includes 1394 Network Controllers similar in construction to 1394 Network Controller 103 and 118.

Figure 2:
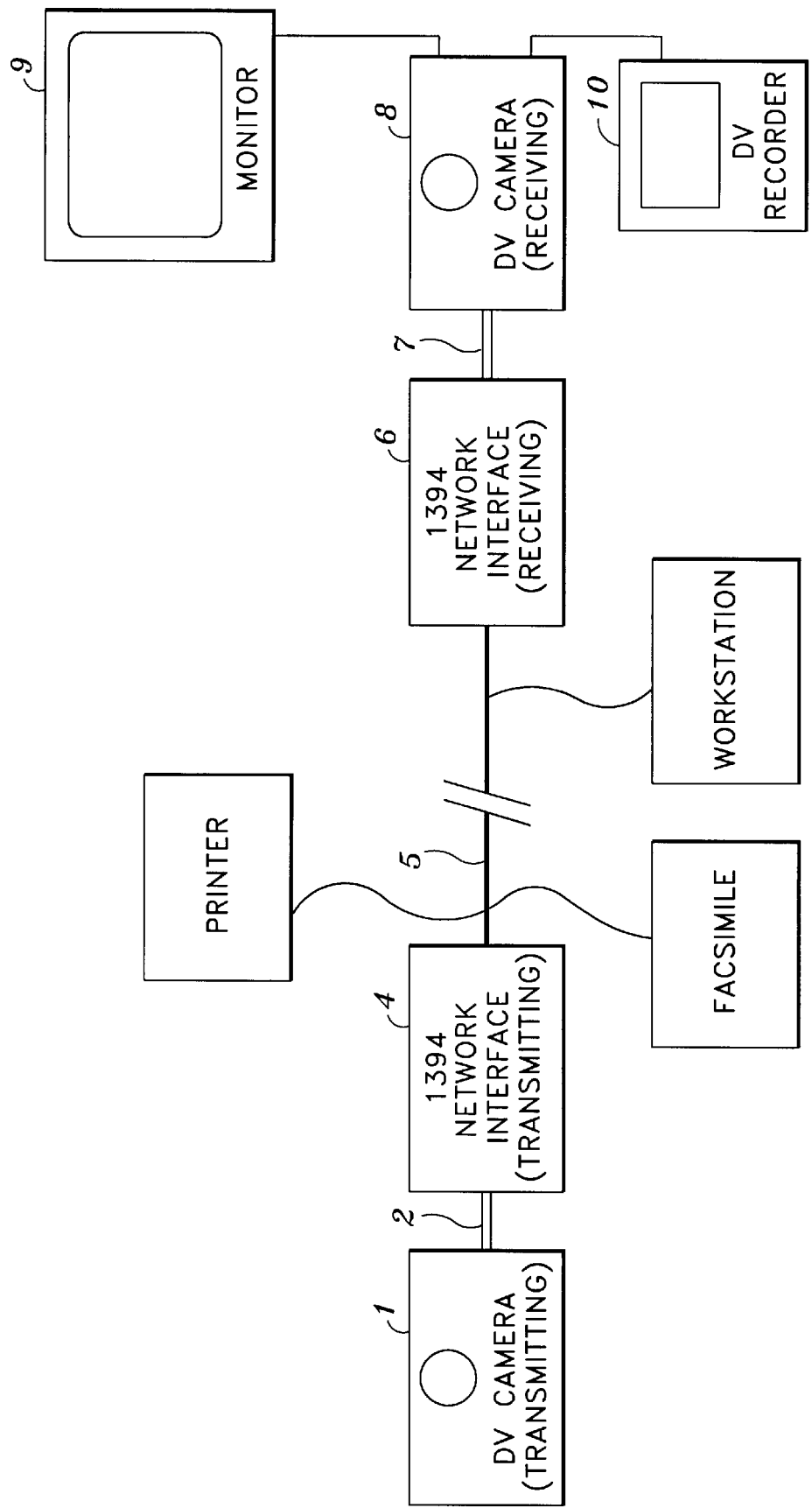
FIG. 2 is a block diagram of a digital video interface network according to the present invention.

FIG. 2 is a functional block diagram depicting the interaction between two devices on the network, such as 1394 Network Controller 103 and 1394 Network Controller 118, or any other two devices on the network for which isochronous-to-asynchronous-to-isochronous data transmission is being provided according to the invention. Thus, in FIG. 2, the two devices are depicted generally, by a local network interface component 4 and a remote network interface component 6. The block diagram of FIG. 2 shows a digital video network interface in which isochronous digital video data formatted in IEEE 1394 standard is transmitted across an asynchronous local area network, such as a Gigabit Ethernet network, to a remote side which receives and decodes the asynchronous network digital video data and converts the digital video data from asynchronous data back to isochronous digital video data.

Specifically, FIG. 2 represents a system in which isochronous digital video data originating inma transmitting digital video (DV) camera is sent by a transmitting network interface across an asynchronous local area network, such as a Gigabit Ethernet network, to a receiving network interface which decodes and outputs the digital video data in isochronous mode to a receiving DV camera.

The transmitting network interface component 4 and receiving network interface component 6 of FIG. 2 are preferably implemented using high performance 233 MHz RISC processors and an embedded operating system which supports real time multitasking, such as VxWorks™ or pSOS™. (Of course, with improvements in operating systems and processor speed, non-real time systems may be used.) By using such real-time multitasking operating systems, the peripheral components which connect to the IEEE 1394 interface and the network interface can be controlled directly, in a real-time and multitasking environment, to maximize video data throughput. A simple datagram protocol such as UDP or IPX is used for video data packet transmission on the asynchronous network. Although datagram protocols do not provide guaranteed packet delivery, the overhead normally associated with packet acknowledgement and sequence control (such as that in TCP/IP) is completely eliminated, making additional throughput available to restore isochronous video data flow at the receiving end.

Shown in FIG. 2 is a digital video (DV) camera 1 which is set up to transmit digital video data over its IEEE 1394 interface connection. The video data can be either the image currently viewed by the camera lens or previously recorded data now being played back through the camera from a digital recording tape unit. DV camera 1 is connected to the transmitting 1394 network interface 4 via an IEEE 1394 serial cable 2. The IEEE serial cable 2 carries packets of digital video data which are being sent isochronously, one packet in every 125 microsecond isochronous interval, by DV camera 1. Each data packet contains 488 bytes of compressed video data and at the rate of one packet in each isochronous interval or 8000 packets per second, the resulting video data flow rate can be calculated to be 3.9 megabytes per second.

Transmitting-side 1394 network interface 4, described in detail below, is a system for receiving digital video packets from the 1394 serial cable 2, removing the 1394 data packet headers, repackaging two or more (preferably three) data packets into network protocol format and transmitting the data over the asynchronous network 5. In the preferred embodiment, asynchronous network 5 is preferably a Gigabit Ethernet network which may utilize fiber optics or copper wire as a communication medium and which has sufficient bandwidth (here, 125 megabytes per second is sufficient although 100BaseT also provides sufficient bandwidth) to accommodate the video data flow from transmitting 1394 network interface 4 as well as other data packets originating from other work stations and/or devices attached to the asynchronous network.

Receiving-side 1394 network interface 6, like transmitting 1394 network interface 4, is connected to the asynchronous local area network 5 and provides a connection to the IEEE 1394 serial cable 7. Receiving 1394 network interface 6 receives and unpackages network data packets arriving from asynchronous network 5, reformats the video data into IEEE 1394 format and transfers the video data packets via the IEEE 1394 serial cable 7 to the isochronous receiving unit, DV camera 8. Cable 7, like cable 2, has a data transfer rate of 3.7 Mbytes/sec.

After receiving and unpackaging network data packets from local area network 5, network interface 6 outputs data isochronously through cable 7 to DV camera 8, which is also a full motion DV camera. DV camera 8 at the receiving side decodes the data for output to monitor 9 and, if connected, DV recorder 10 records the data received in DV camera 8.

The system can be operated uni-directionally, with video data streaming to one receive-only station or being broadcast or multicast to one or more receive-only stations; or the system can be operated bi-directionally with both receive and transmit capabilities at each of two or more stations.

In operation, DV camera 1 may be used at a remote monitoring station to transmit video data packets isochronously over IEEE 1394 cable 2 to the receiving side. The data is received by network interface 4 which buffers the data and negotiates access to the network until access is provided by network 5. Network 5 is a local or wide area network, preferably a Gigabit Ethernet network, which is a multi-user network which may be also connected to other peripheral devices such as a facsimile, printer and individual work stations, as described above in connection with FIG. 1. Wide area network 5 is an asynchronous network which does not guarantee access to the network at any specific time interval or data cycle. Because the DV camera 1 outputs data in an isochronous fashion (every 125 usec), that is, at specific time intervals/data cycles, 1394 network interface 4 must buffer the received video data packets until access to network 5 is obtained. 1394 network interface 4 also repackages the data into a specific network protocol format, such as Gigabit Ethernet format. The data is transmitted to a receiving side, or broadcast or multicast to multiple receiving sides.

At the receiving end, network interface 6 buffers the data that is received as well as unpackages the data from its network format into a IEEE 1394 format which is the format the receiving isochronous unit, DV camera 8, expects to receive. 1394 network interface 6, after unpackaging the data and restoring the data to its proper format, outputs the data at an isochronous timing/data cycle over IEEE 1394 standard cable 7 to DV camera 8. Upon receiving the data, DV camera 8 decodes the data and transmits the video data to monitor 9 for viewing or transmits the video data to be stored in DV recorder 10.

Figure 3A:
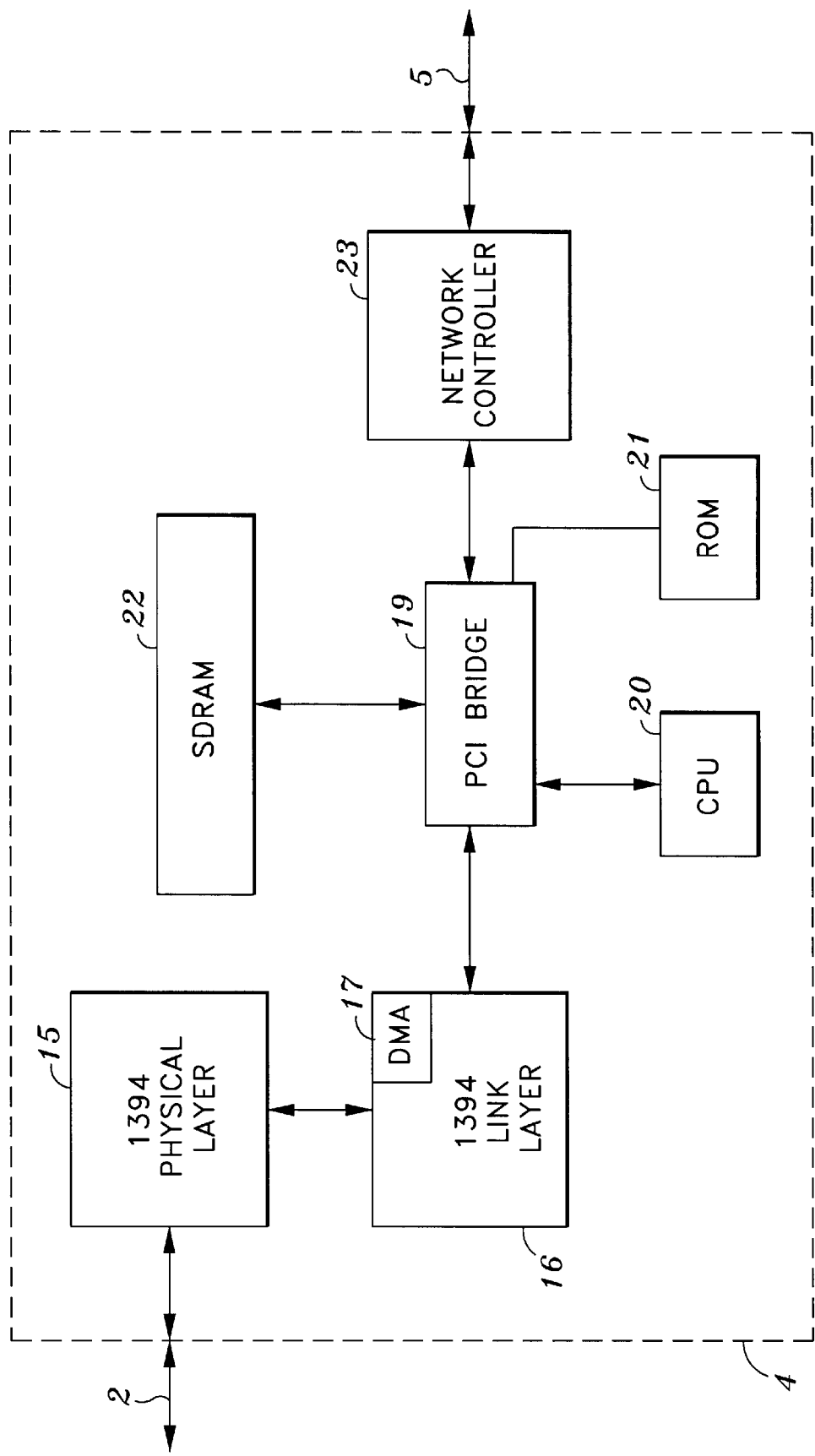
FIG. 3A is a block diagram of a network interface used in the digital video network interface according to the present invention.

FIG. 3A is a block diagram depicting the internal components of 1394 network interface 4. In this embodiment, which supports bi-directional transmission and reception so as to enable video conferencing, 1394 network interface 4 and network interface 6 are identical in hardware structure; therefore, a description of hardware components for 1394 network interface 6 will not be presented for the purposes of brevity.

Shown in FIG. 3A is physical layer 15 which is an IEEE 1394 interface connection which provides the electrical and mechanical interaction with cable 2. Physical layer 15 is connected with 1394 link layer 16 which is an IEEE 1394 interface link which controls access to the IEEE 1394 bus and which ensures that received data is properly formatted for further transmission. Link layer 16 is connected to the peripheral component interconnect (PCI) bus which operates within 1394 network interface 4. PCI bridge 19 manages the flow data through network interface 4 over the PCI bus from link layer 16, CPU 20, ROM 21, SDRAM 22 and network controller 23.

In the preferred embodiment, link layer 16 is an IEEE 1394 link, with a PCI interface which includes DMA (direct memory access) 17; CPU 20 is preferably a 233 hz StrongArm RISC processor; ROM 21 is preferably an 8 Mbyte memory which stores all software including initialization software for 1394 network interface 4 including isochronous and network initialization software; SDRAM 22 is preferably a 16 Mbyte or larger memory which, in the present embodiment, is separated internally into first and second buffers of equal size and a working memory region; and network controller 23 is preferably a Gigabit Ethernet PCI MAC (Media Access Controller) which utilizes UDP transport protocol for transmitting/receiving data through network 5 and includes various software drivers for operation in the present invention. Network controller 27 operates under control of an unshown network protocol stack, which is software executed by CPU 20.

Upon power-on and initialization, the operating system software, such as VxWorks® or the like, is loaded from ROM 21, into the working memory region of SDRAM 22. In addition, initialization software for 1394 network interface 4 is loaded into SDRAM 22 and executed by CPU 20. The initialization software includes process steps which, upon execution, create asynchronization sync semaphore (which is used to coordinate use of the first and second buffers), establish a network connection with the Gigabit Ethernet network, and build a USP socket for transmitting/receiving network packets. The initialization software further checks the functionality of hardware on 1394 network interface 4, enables 1394 digital video interrupts, connects digital video interrupts to PCI bridge 19, which in turn connects the interrupts to CPU 20, and allocates memory for data to be stored in first and second buffers in SDRAM 22. The digital video interrupts interrupt CPU 20 upon filling of one of the buffers in SDRAM 22, as described more fully below. Briefly, the amount of memory space allocated for one buffer has been determined to be approximately 1/30 seconds worth of video data, which is about 130 Kbytes. This amount of data is one frame of data and is about the greatest amount of data that should be stored per buffer in order to prevent visible output latency at the receiving side due to output delay caused by buffering the isochronous data flow. Finally, the initialization software builds a channel program, which directs DMA 17 to store data in the first and second buffers of SDRAM 22.

After initialization, 1394 network interface 4 is up and running and waits to receive the first digital video data packets from DV camera 1.

From the sending station, DV camera 1 transmits isochronous data packets over cable 2 into 1394 network interface 4. The digital video data packets enter 1394 network interface 4 through physical layer 15. Physical layer 15 transmits the 1394-formatted data to link layer 16, which interprets the received data and identifies which device sent the data and which device should receive the data. In this regard, link layer 16 receives data packets, which are formatted in IEEE 1394 standard, and which contain various headers and fields to identify and route the contained data.

FIG. 3B illustrates a typical IEEE 1394 formatted isochronous data packet. The fields and headers of each data packet have the following definitions:

Header: includes fields for data length, tag, channel, tcode and sy, all of which are described below.

Data_length: is the length of data in bytes.

tag: is the tag field, which defines the type of data being transmitted, i.e., digital video, facsimile data, etc.

channel: is the channel field which specifies the IEEE 1394 channel that this packet is being transmitted on. IEEE 1394 standard provides for 0–63 broadcast channels.

tcode: is the transaction code that specifies what type of transaction shall be performed on the packet.

Sy: is the synchronization code which is application specific.

header CRC: the CRC (Cyclical Redundancy Check) is provided to verify that the header was transmitted accurately.

data field: contains the data for the packet.

data CRC: the CRC (Cyclical Redundancy Check) is provided to verify that the data was transmitted accurately.

Upon receiving the IEEE 1394 data packet, physical layer 15 transmits the data packet to link layer 16. Link layer 16 interprets the data in the data packet and removes all except data, meaning that header information, header_CRC information and data_CRC information, are all removed. This leaves just the data field from the packet, which DMA 17 transmits to SDRAM 22. That is, link layer 16 interprets the IEEE 1394 header and the information regarding the data in the data packet in order to know where the data came from and where the data is going. Link layer 16 then strips off unneeded information leaving only the data field. DMA 17, which resides in link layer 16, outputs only the data field directly into a buffer in SDRAM 22 via PCI bridge 19.

DMA 17, in accordance with the channel program, sends data to SDRAM 22 which is set up with a double buffer arrangement. Each buffer is 490 bytes wide and each, according to the present invention, is 267 packets deep, where 490×267=130,830 bytes in correspondence to one frame of video data. DMA 17 captures digital video packets and places them into the first buffer until it is full.

Upon filling one buffer, in SDRAM 22, CPU 20 is interrupted and, if necessary, pads each data packet length to be consistent with the size of the data packet. For example, 1394 data is 488 bytes wide; thus, padding is added to the end of each packet to 490 bytes, in correspondence to the width of the double buffer in memory in SDRAM 22. Once the first buffer is filled and CPU 20 has padded the data packet length, CPU 20 requests network controller 23 to request access to the network and to transfer the contents of the first buffer to the internal transmit buffer of network controller 23. The request to network controller 23 is through an unshown software module such as a network protocol stack or other network driver. While CPU 20 is controlling the padding and flow of data packets from the first buffer of SDRAM 22 to network controller 23, DMA 17 is capturing data packets and filling the second buffer of SDRAM 22. This procedure of emptying the first buffer while filling the contents of the second buffer, and thereafter emptying the second buffer while filling the first buffer, is repeated until all data packets have been transmitted.

Upon receiving a request from CPU 20 to access the network, network controller 23 transfers the data from the SDRAM buffer to an internal transmit buffer in controller 23. Controller 23 then negotiates the network 5 for access to the network. In addition, network driver software for network controller 23 packages the received data in conformance with the standard protocol for the network, to the extent that the software protocol stack has not already done so. When access is provided, network controller 23 transmits the contents of its internal buffer over network 5.

As network data packets are received at the remote side, 1394 network interface 6, which has identical hardware as that of 1394 network interface 4, begins to unpackage the network packets. After unpackaging and stripping off network headers, the receiving data packet is temporarily stored in its receipt buffer.

Because 1394 network interface 6 has the same hardware, reference to hardware in FIG. 3A will be used. In 1394 network interface 6, the receiving side SDRAM 22, while being the size as the transmitting side SDRAM, uses only one buffer to store data packets and, according to the present invention, does not output data from that buffer until at least 2 frames worth of data are stored in the buffer. This ensures that the buffer will not run out of data before the next input of data from the network.

Once at least two frames of data have been stored in SDRAM 22, link layer 16 receives data from SDRAM 22 via DMA transfer over the PCI bus, repackages the data into isochronous format, and sends the data out through physical layer 15. In turn, physical layer 15 outputs the digital video data through the IEEE 1394 bus to the receiving unit, DV camera 8.

Figure 4A:
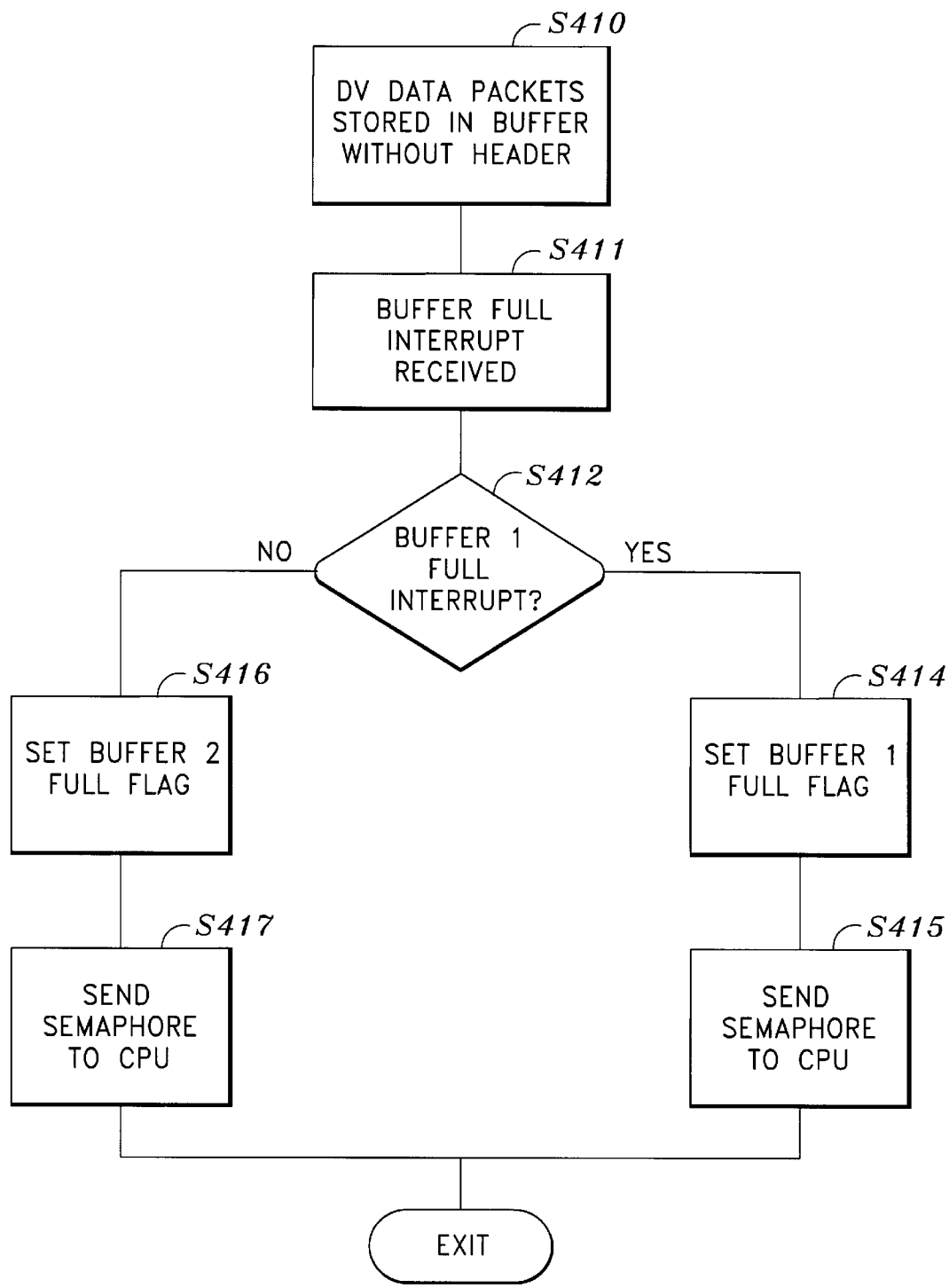
FIGS. 4A–4D are flowcharts depicting the transfer and receipt of isochronous data over asynchronous network.
Figure 4B:
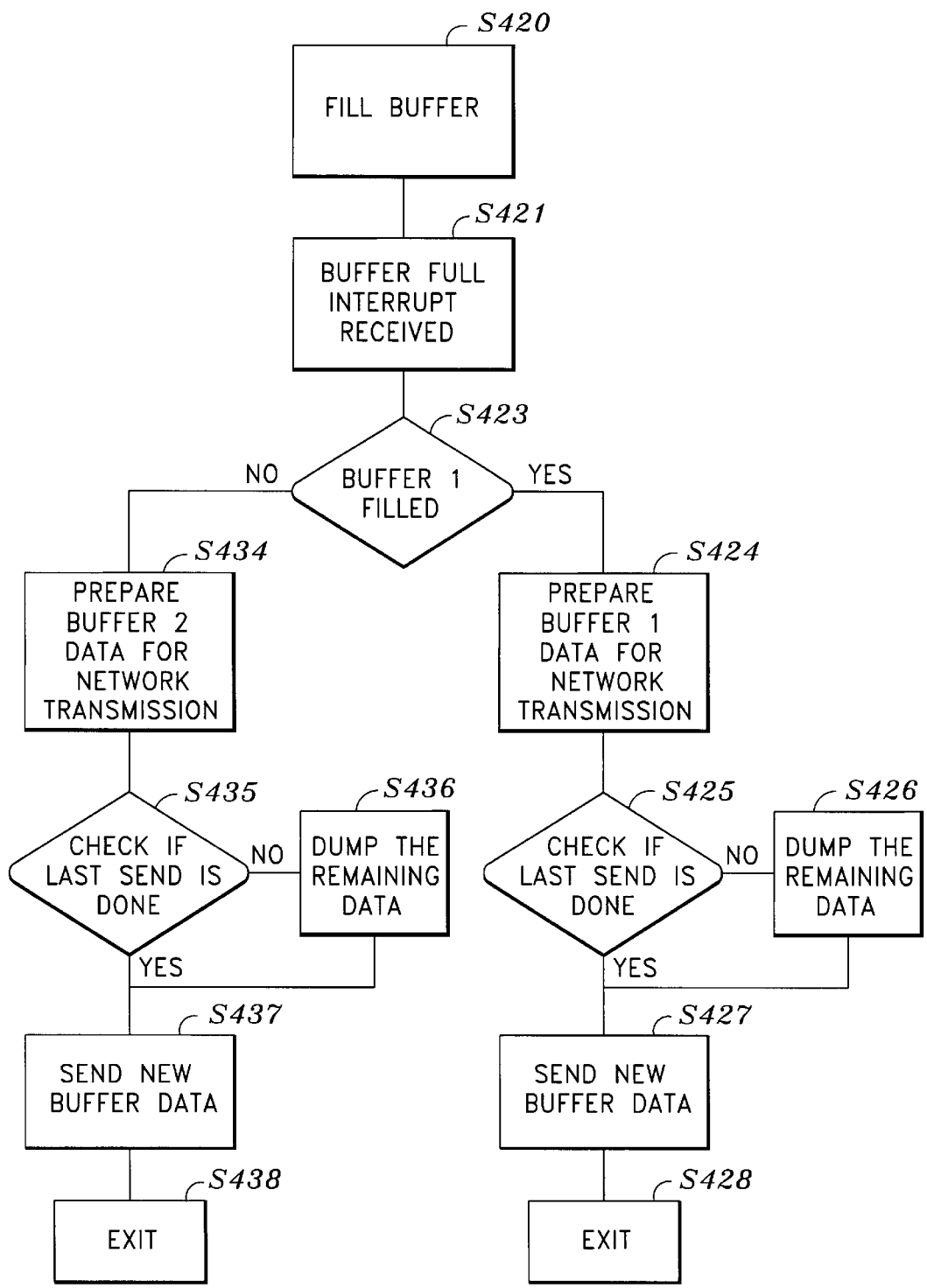
Figure 4C:
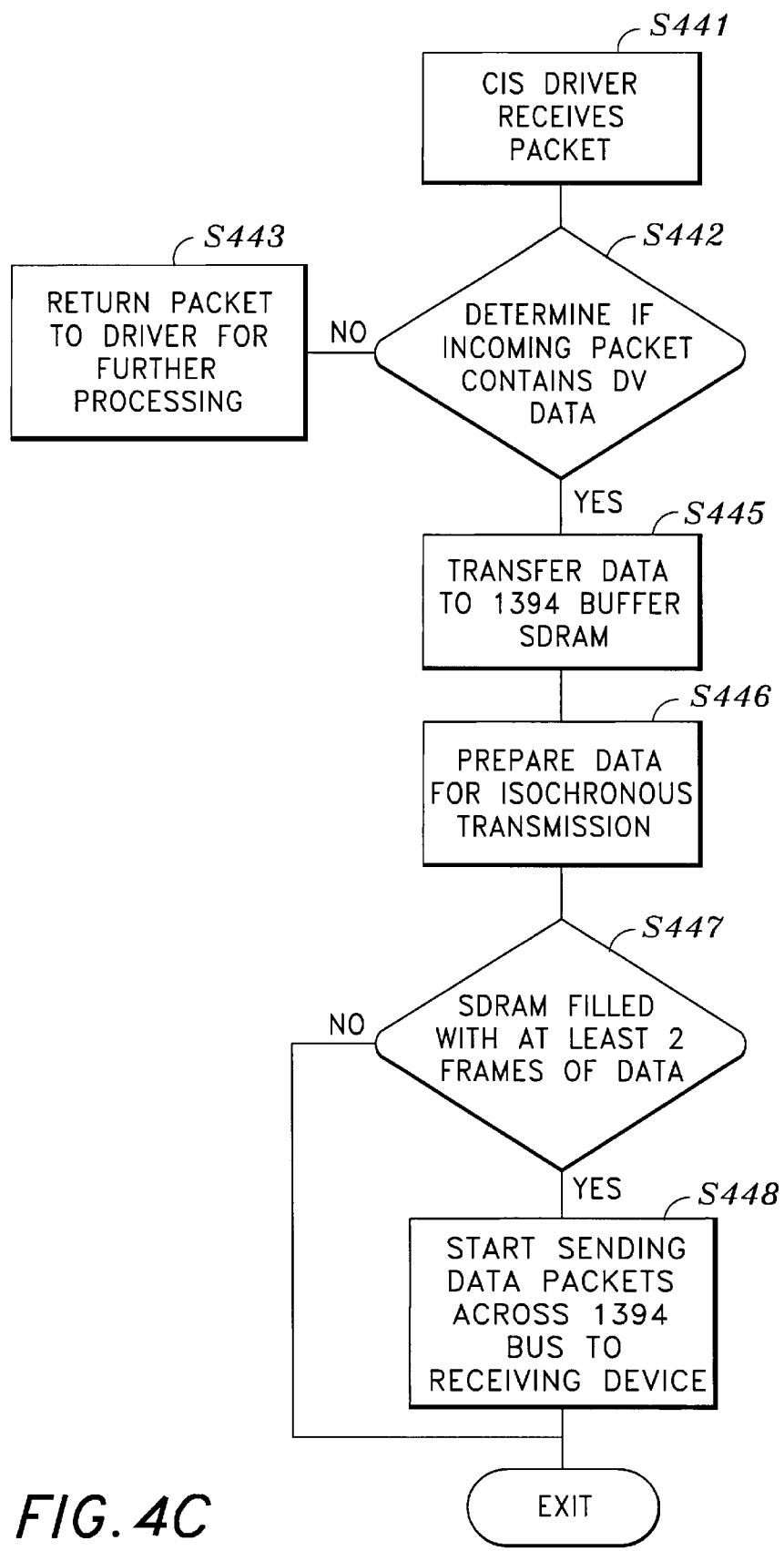
Figure 4D:
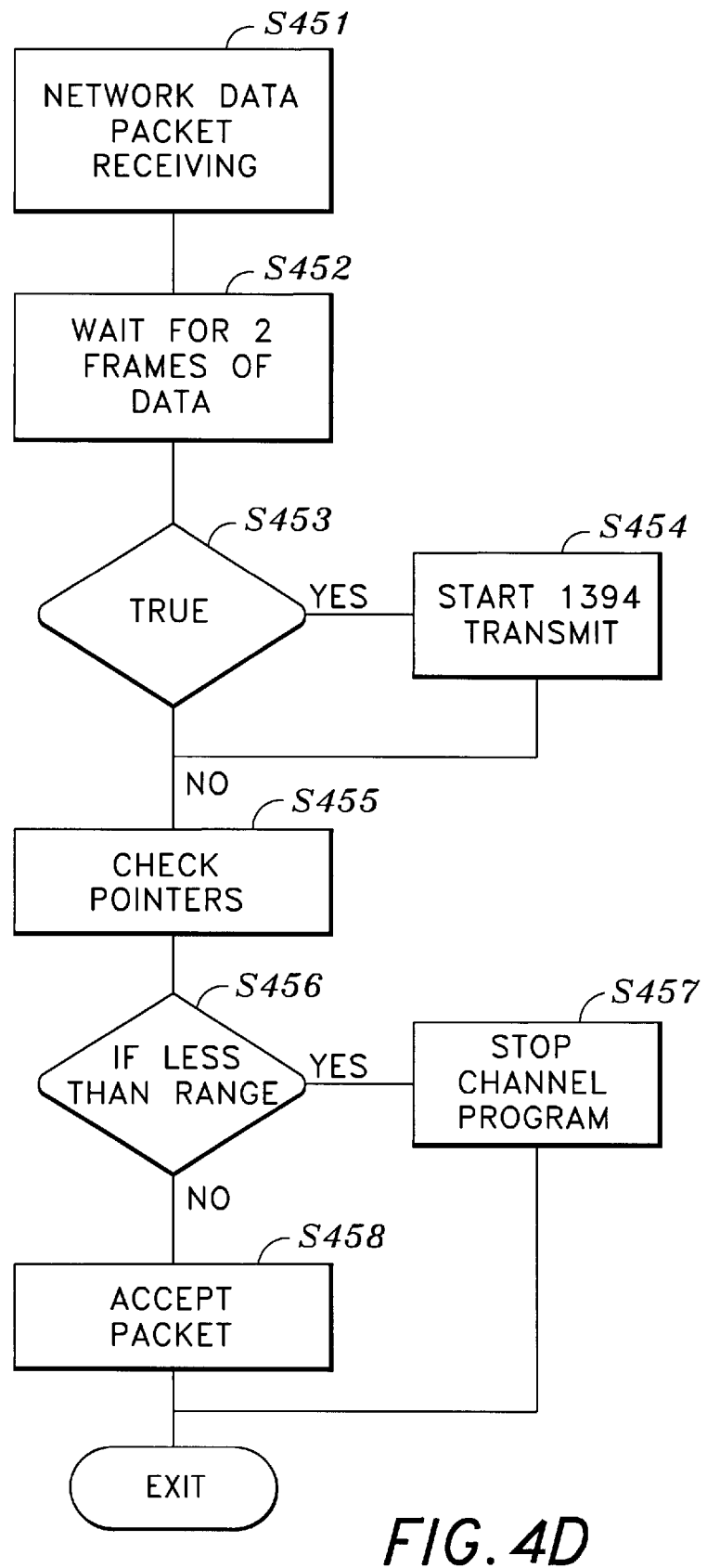

FIGS. 4A through 4D are flow diagrams illustrating process steps so as to effect transmission of isochronous data over an asynchronous network to a receiving station and conversion of the asynchronously-received data back to isochronous format at a receiving station. The process steps shown in FIG. 4A are executed primarily by link layer 16 and DMA 17 so as to effect storage of isochronously-received data into SDRAM 22; the process steps shown in FIG. 4B are executed primarily by CPU 20 in conjunction with a software module containing a network protocol stack that controls network controller 23; the process steps shown in FIG. 4C are executed primarily by network controller 23 and an associated network protocol stack at a receiving side; and the process steps shown in FIG. 4D are executed primarily by CPU 20 in conjunction with link layer 16 and DMA 17 so as to repackage asynchronously received data into isochronous format for transmission to an isochronous device over a 1394 bus.

In more detail, in step S410, DMA 17 stores digital video data packets into one of buffers 1 and 2 in SDRAM 22. As previously described, the data packets are stored without header information or cyclical redundancy information, and may be padded so as to extend the length of each packet from 488 bytes to 490 bytes.

In step S411, in response to a determination that one of the two buffers is full, a digital video interrupt is signaled. Steps S412 through S417 determine which buffer has been filled, so as to send an appropriate semaphore to CPU 20. Thus, if the buffer full interrupt has been received and buffer 1 is full, then flow branches to steps S414 and S415 in which a flag indicating that buffer 1 has been filled is set, and an appropriate semaphore is sent to CPU 20. Likewise, if step S412 determines that buffer 1 has not been filled, then flow branches to steps S416 and step S417 in which the flag is set to indicate that buffer 2 is full, and an appropriate semaphore is sent to CPU 20.

In either event, flow thereafter exists so as to re-enter at step S410, to wait further receipt of digital video data packets.

When a buffer full interrupt has been received, indicative that one of buffers 1 and 2 has been filled, the process steps of FIG. 4B are executed. In step S420, CPU 20 determines which of the two buffers has been filled by reference to the flags set at steps S414 and S416. If, in step S423, CPU 20 determines that buffer 1 has been filled, then flow branches to steps S424 through S428 in which data in buffer 1 is sent out asynchronously over network 5. Specifically, data in buffer 1 is prepared for network transmissions (step S424) a check is made to see if the last packet from a previous transmission from buffer 2 has already been completed (step S425), remaining data from buffer 2 is emptied (step S426) if any data remains, data in buffer 1 is sent asynchronously over network 5 (step S427) and flow thereafter exits to await receipt of a next buffer interrupt (step S428).

In like manner, if CPU 20 determines in step S423 that buffer 1 has not been filled, then flow advances to steps S434 through S438 so as to send out data in buffer 2 asynchronously over network 5. Thus, step S434 prepares data in buffer 2 for transmission over the asynchronous network, step S435 determines whether all data from a prior transmission of buffer 1 has already been sent, step S436 empties any remaining data in buffer 1 if any data remains from a prior transmission, step S437 sends the data in buffer 2, and step S438 exits to await receipt of a next buffer full interrupt.

At the receiving side, the process steps of FIG. 4C are executed. Network controller 23 and its associated protocol stack receive a network packet from asynchronous network 5 in step S441. Step S442 determines if the incoming packet contains digital video data. If no digital video data is included in the incoming packet, then flow branches to step S443 since the packet would not then concern isochronous data transmission according to the invention. Thus, step S443 returns the packet to network controller 23 for default network protocol stack processing.

On the other hand, if the incoming data packet contains digital video data, then flow advances to step S445 in which the software protocol stack is completely bypassed so as to transfer the data portion of the packet directly to SDRAM 22. Specifically, under some circumstances, it is possible to make a simplifying assumption with respect to processing of digital video data received over the network: that any such digital video data properly received at the network socket for network controller 23 is ultimately destined for an IEEE 1394 bus interface. In accordance with this simplifying assumption, therefore, it is possible to bypass network protocol processing which ultimately would result in the extraction of the data portion of a network transmission. Rather, it is possible simply to obtain a raw network transmission, and to extract the needed data portion directly without any other processing inherent in network protocol stack processing.

Thus, step S445 bypasses the protocol stack normally associated with network controller 23, and, after stripping off unneeded network headers and the like, transfers only the data directly to SDRAM 22. The data is stored to an address indicated by an input pointer, whose value is updated after storage so that the next receipt of data from network 5 is stored to the correct location. Step S446 prepares the data for isochronous transmission, such as by alignment of bytes and removal of any padded bytes. Step S447 determines whether the SDRAM has been filled with at least two full frames of data. Until SDRAM 22 has been filled with at least two full frames of data, flow exits so as to re-enter at step S441, upon receipt of additional digital video data. On the other hand, when two full frames of digital video data have been stored in SDRAM 22, flow advances to step S448 so as to start sending data packets through link layer 16 and physical layer 15 to an IEEE 1394 bus, for receipt by a receiving device, as described more fully below in connection with FIG. 4D.

Specifically, in FIG. 4D, following receipt of network data packets and a wait until two full frames of data have been received (step S451 and S452, both of which are described above in connection with FIG. 4C), and a determination in step S453 that two full frames have been stored in SDRAM 22, flow branches to step S454 in which transmission of the first frame of digital video data is commenced in accordance with IEEE 1394 isochronous protocol. Specifically, an empty pointer is maintained for determining where in SDRAM 22 the next data for isochronous conversion is stored. DMA 17 accesses the SDRAM at the location of the empty pointer, and gives the digital video data to link layer 16 for reconstruction of the headers shown in FIG. 3B. After reconstruction of the IEEE 1394 headers, link layer 16 gives the data, which is now formatted in accordance with IEEE 1394 protocol to physical layer 15 for isochronous transmission out across 1394 bus to a receiving digital video device.

Flow next proceeds to step S455, in which CPU 20 determines whether there has been a data overrun or underrun in connection with storage of new network data to SDRAM 22, or in connection with emptying of SDRAM 22 by DMA 17. Specifically, two pointers are maintained, an input pointer and an empty pointer. The input pointer points to the next location in SDRAM 22 into which newly-received data from network 5 is stored. The empty pointer points to the next location in SDRAM 22 where DMA 17 obtains data for conversion to isochronous transmission. If the empty pointer is less than the input pointer (step S456), then DMA 17 has run out of data to convert to isochronous format. In such a circumstance, flow branches to step S457 in which the DMA channel program is stopped. This results in a freeze of digital video data, meaning that no new data is given to the isochronous device connected to IEEE 1394 bus 2.

On the other hand, if the input pointer is not less than the empty pointer, then flow advances to step S458 so as to accept new data packets from network 5 for storage into SDRAM 22. Operation in accordance with this step results in overwriting of digital video data already in SDRAM 22; of course, this results in a discarding of such data if it has not already been emptied by DMA 17 and not already been converted to isochronous format. Thus, if too much data is received from network 5, previously-received data is simply discarded.

Figure 5:
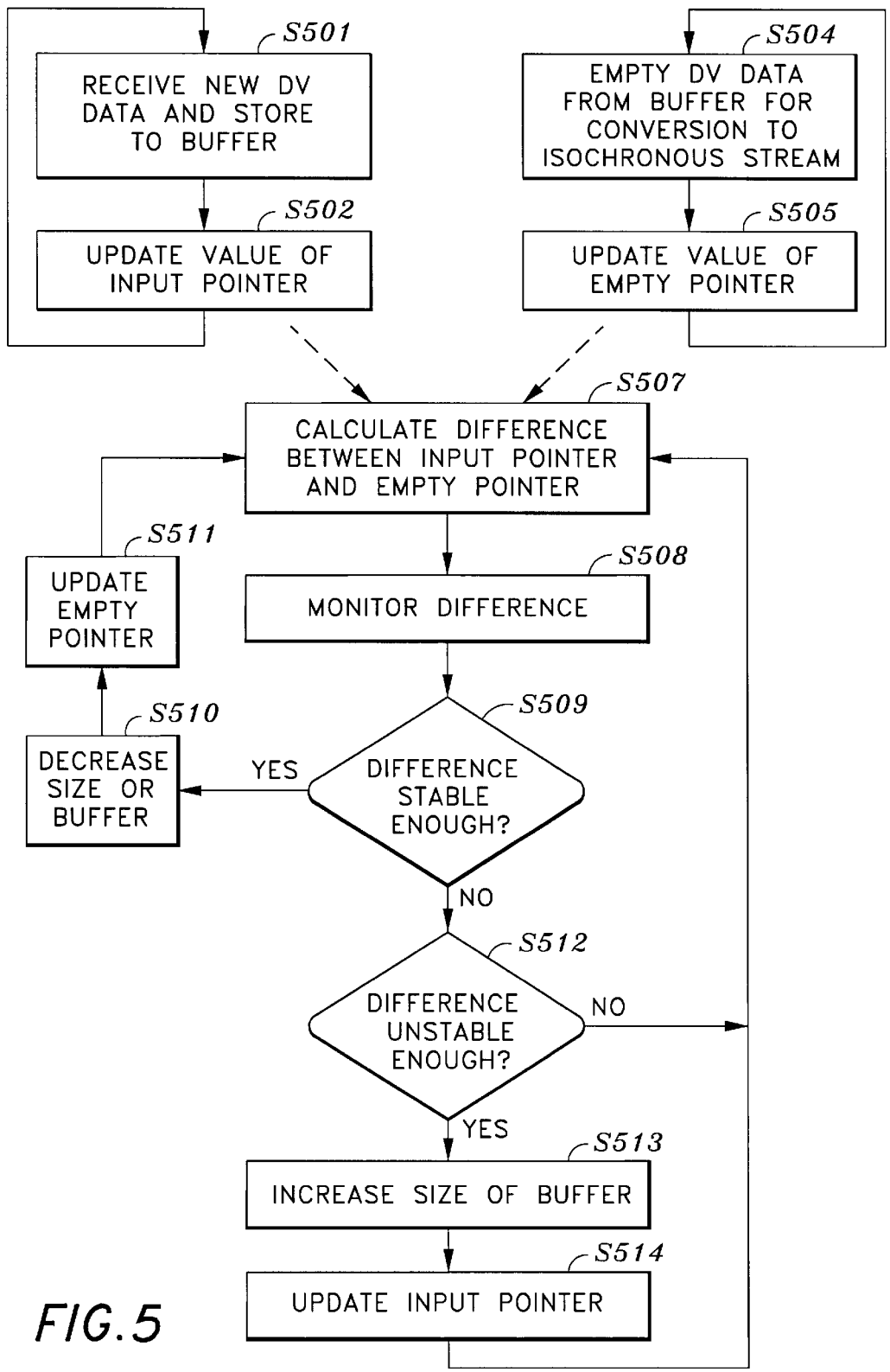
FIG. 5 is a flow diagram illustrating a second embodiment of the invention.

FIG. 5 is a flow diagram illustrating a second embodiment of the invention, in which buffer size is dynamically altered, so as to adjust automatically and dynamically to other network traffic that might otherwise interfere with the transmission of digital video data over network 5. Specifically, according to this second embodiment, a modification may be made to the first embodiment so as to allow the size of the buffer to be modified dynamically and automatically, so as to accommodate current network characteristics such as busyness (heavy traffic, heavy loads, excessive retrys, broadcast packets, etc.), which are made on an on-going basis in real time.

More specifically, the ability to transmit an isochronous digital data stream over an asynchronous network, and at the same time to retain the ability faithfully to reconstruct the characteristics of the original isochronous stream, are both dependent on the isochronous receiver's ability to buffer the incoming data stream. The size of the buffer directly affects the amount of latency (or delay or timing shift) between the original isochronous data stream and the resulting reconstructed stream. At the same time, the size of the buffer is dependent on the degree of variability to access of the bandwidth available on the isochronous network. The variability of access to the network depends on available bandwidth of the network, the number of nodes on the network, network traffic patterns, and the like. According to the invention in this second embodiment, the size of the buffer, and therefore the amount of latency, is dynamically and automatically adjusted based on real-time checks that monitor current network characteristics. If the checks indicate a low degree of variability to network access (corresponding to a high bandwidth network and/or a quiescent network with low traffic patterns), then the buffer is adjusted to be small. On the other hand, if the checks indicate a high degree of variability (indicating a relatively low-bandwidth network and/or an active network with high traffic patterns) then the size of the buffer is automatically adjusted to be large.

Checks on the variability of the network are made by monitoring the state of the input pointer into the received buffer, here SDRAM 22, in which network data is placed, as well as monitor of the empty pointer to the buffer from where data is removed for conversion to an isochronous stream. The relative difference between these two pointers represents the current amount of data received, but not yet reconstructed into an isochronous stream. By monitoring the relative difference between these pointers, a receiver can calculate the amount of variability in the isochronous network 5. If the relative difference between the pointers varies widely and unstably, then the degree of variability is high indicating that a relatively larger buffer size should be created. Likewise, if the relative difference between the pointers is stable, then the degree of variability is low, indicating that the size of the buffer can be adjusted downwardly.

Thus, as shown in FIG. 5, an input pointer and an empty pointer are maintained so as to coordinate where new digital video data is stored in SDRAM 22 in connection with the receipt of new digital video data over the asynchronous network (in connection with steps S501 and S502), and in connection with emptying of SDRAM 22 by DMA 17 during conversion of the digital video data into an isochronous stream (in connection with steps S504 and S505).

Step S507 calculates the difference between the input pointer and the empty pointer, and step S508 monitors this difference. If the difference is stable, then the values of the input pointer and the empty pointer indicate that a relatively high bandwidth and/or quiescent network is present, meaning that the size of the buffer can be decreased. "Stable" may be defined as those circumstances where the difference between the input pointer and the empty pointer indicate that only about 10% or less of the total available buffer space is currently in use at any one time, over an extended period such as several seconds. If step S509 determines that the difference is stable, then flow branches to step S510 in which the size of the buffer is decreased, and the value of the empty pointer is updated in accordance with the new size of the buffer (step S511). Of course, decreasing the size of the buffer results in a temporary loss of incoming data (or of data already in the buffer), in correspondence to the newly-reduced latency of the overall video transmission.

On the other hand, if step S509 determines that the difference is not stable, then step S512 determines whether if the difference between the input pointer and the empty pointer indicates that the system is too unstable and an increase in buffer size is warranted. If the difference is not unstable enough, then no change in buffer size is made. On the other hand, if it is unstable enough, then flow advances to steps S513 and S514 so as to increase the size of the buffer. An unstable difference may be determined when the difference between the input pointer and the empty pointer indicates that greater than 50% of the total amount of the buffer space is ordinarily in use at any one time, over an extended period such as several seconds. Under such circumstances, the size of the buffer is increased (step S512), and the value of the input pointer is updated (S513) so as to compensate for the newly increased size of the buffer. Of course, with the newly-increased size of the buffer, there is a temporary halt of the outgoing isochronous data stream, until newly-received asynchronous digital video data fills up the newly-increased size of the buffer, in correspondence to the newly-increased latency of the overall system.

While the present invention has been described with respect to what is presently considered to be the preferred embodiments, it is to be understood that the invention is not limited to the disclosed embodiments. For example, it is possible to modify the invention such that the two-way digital video data communication shown above, which results in the ability to conduct digital video conferencing, is modified to a one-way system in which digital video data is streamed from a transmitting side to one or more receiving sides. Under such circumstances, 1394 Network Controllers 103 and 118 may be modified, as appropriate, so as to include only such circuitry and software modules as are needed for the particular function of transmit only or receive only. Moreover, although UDP protocol is preferred, any protocol may be utilized, although it is preferred to use a protocol which does not necessarily waste large amounts of overhead in an attempt to insure a guarantee of network transmissions. Further, although it is preferred, as a time-saving assumption, to bypass several irrelevant layers of the network protocol stack, it is possible for those layers to be executed particularly in systems for which suitable processing power is available. Moreover, although the isochronous data sources illustrated in the present embodiments are digital video cameras, other isochronous data sources may be substituted, with no change in the principle of operation of the invention.

Accordingly, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A digital video network interface for transferring isochronous video data over an asynchronous local area network, comprising:

an isochronous interface for transmitting digital video data isochronously;

a memory comprising first and second buffers for storing the isochronous video data;

a network interface for transmitting video data from either the first or second buffers over the asynchronous local area network; and a memory buffer manager for controlling the output of the video data over the asynchronous local area network and for controlling the input/output of video data into/from the first or second buffers, wherein, when either the first or second buffers is filled with video data, the memory buffer manager shifts the input of data into an empty buffer and begins outputting video data to the asynchronous local area network from a filled buffer, upon receiving access to the local area network.

2. An interface according to claim 1, wherein the video data is received over the isochronous interface in data packets having a first predetermined size, data packets stored in the first or second buffers of the memory are data packets of video data having a second predetermined size and the video data which is transmitted over the network is a combination of data packets having the second predetermined size, wherein the memory buffer manager modifies the length of data packets of the first predetermined size received from the isochronous interface to produce data packets of the second predetermined size prior to storing the data packets in the first or second buffers in the memory, and combines the data packets of the second predetermined size prior to outputting data packets on the asynchronous local area network.

3. A method for transferring data between an isochronous data source and an asynchronous local area network comprising the steps of:

receiving data packets isochronously from an isochronous data source;

storing data packets from the isochronous data source in a buffer having first and second memory areas;

accessing the asynchronous local area network; and transferring data packets, over the asynchronous local area network, wherein data packets are stored in either the first or second memory areas of the buffer, such that when one memory location is filled the other memory location receives data and wherein the transfer of data packets comes from the filled memory location, whereupon the filling of a memory location, network access is requested and, upon receiving access, the data packets from the filled memory location are output over the asynchronous local area network.

4. A digital video network system, comprising:

an asynchronous local area network for transferring data;

a digital video camera for generating and transmitting digital video data isochronously;

a peripheral digital video device for receiving digital video data;

a transmitting digital video network interface for transferring data between the digital video camera and the asynchronous network, the transmitting digital video network interface having a transmitting isochronous interface for receiving data packets from the digital video camera isochronously, a transmit buffer having first and second memory locations for storing data packets, a network interface for transferring the data packets from either the first or second memory locations of the buffer through the asynchronous local area network, and a transmit memory buffer manager for 1) controlling the transfer of data packets from the isochronous interface to either of the first or second memory locations in the buffer and 2) controlling the transfer of data packets from either the first or second memory locations of the buffer through the network interface by requesting access of the asynchronous local area network, wherein the transmit memory buffer manager controls the storage of the data packets into either the first or second memory location of the buffer, and wherein, when one memory location has been filled, the transmit memory buffer manager requests access to the network and, upon receiving access, transmits data packets from the filled memory location; and a receiving digital video network interface for transferring data between the asynchronous local area network and the peripheral digital video device, the receiving digital video network interface having a network interface for receiving video data packets from the asynchronous local area network, a receive buffer having first and second memory locations, a receiving isochronous interface for transmitting video data packets to the peripheral digital video device, and a receive memory buffer manager for 1) controlling the transfer of data packets from the network interface to the receive buffer and 2) controlling the transfer of video data packets from the buffer to the receiving isochronous interface, wherein the memory buffer manager controls the storing of data packets into a location pointed to by an input pointer, and wherein the receive memory buffer manager controls the output of video data in an isochronous fashion from a memory location pointed to by an empty pointer through to the receiving isochronous interface.

5. A method for transmitting digital video data, for use in a digital video conferencing system, in which digital video data is transmitted from one isochronous bus to another isochronous bus via an asynchronous bus, the method comprising the steps of:

establishing an isochronous communication and an asynchronous network connection at the receiving side;

establishing an isochronous communication and an asynchronous network connection at the sending side;

negotiating between the sending side and receiving side to open an asynchronous transmission;

converting isochronous digital video data into asynchronous network data at the sending side;

transmitting the asynchronous network data packets to the receiving side;

receiving the asynchronous network data at the receiving side; and converting the asynchronous network data to isochronous digital video data at the receiving side.

6. The method according to claim 5, wherein there are plural receiving sides, each receiving a multicast or broadcast asynchronous network transmission, and each converting to isochronous digital video data.

7. The method according to claim 5, wherein the receiving side and the sending side perform complementary steps so as to achieve full duplex digital video data transmission and reception.

8. The method according to claim 5, wherein the receiving side maintains a buffer to buffer received asynchronous network data.

9. The method according to claim 8, wherein the size of the buffer is dynamically and adaptively adjusted.

10. The method according to claim 9, wherein the size of the buffer is dynamically and adaptively adjusted based on a real-time monitor of network characteristics.

11. The method according to claim 5, wherein the step of establishing an isochronous communication and asynchronous network connection at the receiving side includes the steps of connecting with a local area network and creating a UDP socket.

12. The method according to claim 11, wherein the step of establishing an isochronous communication and asynchronous network connection at the sending side includes the steps of connecting with a local area network and creating a UDP socket.

13. The method according to claim 5, wherein the step of negotiating includes signalling a network controller to obtain access to the local area network.

14. The method according to claim 13, wherein the step of converting isochronous digital video data includes removing IEEE 1394 header information from the digital video data, adding network header information to the digital video data, repackaging the digital video data with the network header into a network packet which is formatted in accordance with the local area network protocol format and storing the network packet for asynchronous output in the transmitting step.

15. The method according to claim 14, wherein the step of converting asynchronous network data packets includes verifying the network header, removing the network header, unpackaging the digital video data from the local area network protocol, and formatting the digital video data with IEEE 1394 header information.

16. The method according to claim 5, further including the step of transmitting the isochronous digital video data to a digital video device.

17. The method according to claim 5, wherein the receiving step includes the step of executing software steps to 1) intercept incoming network packets so as to bypass network TCP/IP protocol, 2) verify network header information, 3) verify UDP port number, and 4) remove the network header and UDP port number from the network packet wherein, in the case that either the network header information or the UDP port number cannot be verified, the network packet is returned for default processing.

18. A digital video network interface for transferring isochronous video data over an asynchronous local area network, comprising:

an isochronous interface means for transmitting digital video data isochronously;

a memory means comprising first and second buffers for storing the isochronous video data;

a network interface means for transmitting video data from either the first or second buffers over the asynchronous local area network; and.

a memory buffer manager means for controlling the output of the video data over the asynchronous local area network and for controlling the input/output of video data into/from the first or second buffers, wherein, when either the first or second buffers is filled with video data, the memory buffer manager means shifts the input of data into an empty buffer and begins outputting video data to the asynchronous local area network from a filled buffer, upon receiving access to the local area network.

19. A digital video network system for transmitting digital video data, comprising:

a first 1394 interface connected to a bus for transmitting digital video data;

a first network interface connected to a bus;

an asynchronous network connected to the network interface;

a first memory comprising first and second buffers; and a network transmitter controlling the input of digital video data from the first 1394 interface, over the bus, into the memory, packaging the digital video data stored in the memory into asynchronous network data packets and transmitting the output of the network packets over the asynchronous network.

20. The system according to claim 19, further comprising:

a second 1394 interface connected to a remote bus for receiving digital video data;

a second network interface connected to the remote bus;

a second memory for storing received digital video data through the remote bus from the second network interface; and a network receiver for receiving network data packets over the asynchronous network through the network interface, unpackaging the network data packet into digital video data, storing the digital video data into the second memory and controlling the output of digital video data from the second memory over the remote bus to the second 1394 interface.

21. The system according to claim 19, wherein there are plural receiving sides, each receiving a multicast or broadcast asynchronous network transmission, and each converting to isochronous digital video data.

22. The system according to claim 19, wherein the receiving side and the sending side perform complementary steps so as to achieve full duplex digital video data transmission and reception.

23. The system according to claim 19, wherein the receiving side maintains a buffer to buffer received asynchronous network data.

24. The system according to claim 23, wherein the size of the buffer is dynamically and adaptively adjusted.

25. The system according to claim 24, wherein the size of the buffer is dynamically and adaptively adjusted based on a real-time monitor of network characteristics.

26. The system according to claim 20, wherein the network transmitter converts isochronous digital video data received from the first 1394 interface into asynchronous network packets.

27. The system according to claim 20, wherein the network receiver converts asynchronous network packets into isochronous digital video data and outputs the digital video data isochronously through the second 1394 interface.

28. The system according to claim 20, wherein the network transmitter negotiates with the network to obtain access to the network in order to transmit network packets.

29. The system according to claim 20, wherein the network transmitter and network receiver communicates through the network using User Datagram Protocol.

30. The system according to claim 20, wherein the system utilizes an embedded operating system which permits multitasking in real time.

31. The system according to claim 20, wherein the first memory is controlled to store digital video data into the first buffer, and, upon filling the first buffer, storing digital video data in the second buffer and when the second buffer is being filled with digital video data, the first buffer is transmitting digital video data to the network transmitter, upon obtaining access to the network and, when the first buffer is being filled, the second buffer is transmitting digital video data to the network transmitter.

32. The system according to claim 20, further comprising:
a first physical layer connected to the first 1394 interface; and
a first link layer connected to the first physical layer, wherein the link layer receives digital video data transmitted over the bus through the first physical layer, interprets the digital video data and removes 1394 header information from the digital video data before the digital video data is stored in the first memory.

33. The system according to claim 31, wherein in the case that access to the network has not been obtained by the network transmitter after the first buffer has been filled with digital video data and before the second buffer is substantially filled with digital video data, the network transmitter discards the contents of the first buffer.

34. The system according to claim 31, wherein in the case that access to the network has not been obtained by the network transmitter after the second buffer has been filled with digital video data and before the first buffer is substantially filled with digital video data, the network transmitter discards the contents of the second buffer.

35. The system according to claim 20, wherein the second memory includes an input pointer which points to a last memory address of input digital video data in the memory and an empty pointer which points to an memory address of digital video data to be output from the memory.

36. The system according to claim 35, wherein in the case that the input pointer and empty pointer come within a predetermined address range of each other, the remaining data to be output is discarded.

37. A method for dynamically and adaptively adjusting a size of a buffer used to store data received from an asynchronous network, comprising:
monitoring the network in real time so as to obtain an indication of current network characteristics; and
adjusting the size of the buffer based on the indication of current network characteristics,
wherein in said monitoring step, the network is monitored for variability in the degree of access thereto.

38. The method according to claim 37, wherein in said monitoring step, the network is monitored for busyness.

39. The method according to claim 38, wherein said adjusting step adjusts the size of the buffer upwardly in a case where network busyness is high, and downwardly in a case where network busyness is low.

40. The method according to claim 37, further comprising the step of retrieving asynchronously received data from the buffer and converting the retrieved data to isochronous data for transmission to an isochronous interface.

41. The method according to claim 40, further comprising the steps of maintaining an input pointer in correspondence to an address in the buffer where asynchronously received data from the network is stored, and an empty pointer in correspondence to an address in the buffer where data is retrieved for conversion to isochronous data, and where in said monitoring step, the network is monitored for variability in the degree of access thereto based on a real-time difference between the input pointer and the empty pointer.

* * * * *

UNITED STATES PATENT AND TRADEMARK OFFICE
CERTIFICATE OF CORRECTION

PATENT NO.      : 6,438,604 B1
DATED           : August 20, 2002
INVENTOR(S)     : Walter D. Kuver et al.

It is certified that error appears in the above-identified patent and that said Letters Patent is hereby corrected as shown below:

<u>Drawings,</u>
Sheet 9, FIG. 5, "DECREASE SIZE OR" should read -- DECREASE SIZE OF --.

<u>Column 2,</u>
Line 27, "with-the" should read -- with the --; and
Line 33, "reason" should read -- reason that --.

<u>Column 3,</u>
Line 27, "is preserved," should read -- are preserved, --; and
Line 40, "isochronous data." should read -- isochronous data --.

<u>Column 6,</u>
Lines 6, 19 and 25, "a IEEE" should read -- an IEEE --;
Line 29, "Controller" should read -- Controllers --; and
Line 48, "inma" should read -- in a --.

<u>Column 8,</u>
Line 15, "a" should read -- an --;
Line 29, "¶ therefore," (close left margin); and
Line 47, "hz" should read -- Mhz --.

<u>Column 14,</u>
Line 36, "if" should be deleted.

<u>Column 18,</u>
Line 7, "and." should read -- and --.

UNITED STATES PATENT AND TRADEMARK OFFICE
CERTIFICATE OF CORRECTION

PATENT NO. : 6,438,604 B1
DATED : August 20, 2002
INVENTOR(S) : Walter D. Kuver et al.

It is certified that error appears in the above-identified patent and that said Letters Patent is hereby corrected as shown below:

Column 20,
Line 6, "an memory" should read -- a memory --.

Signed and Sealed this

Sixteenth Day of September, 2003

JAMES E. ROGAN
*Director of the United States Patent and Trademark Office*